March 27, 1928.  1,663,539

J. G. BELLINGER

METHOD AND APPARATUS FOR TESTING AND SORTING MATERIALS

Filed Oct. 11, 1919

Inventor
James G. Bellinger
By
Thurston Kwu & Hudson
attys.

Patented Mar. 27, 1928.

1,663,539

UNITED STATES PATENT OFFICE.

JAMES G. BELLINGER, OF CLEVELAND, OHIO.

METHOD AND APPARATUS FOR TESTING AND SORTING MATERIALS.

Application filed October 11, 1919. Serial No. 329,914.

This invention relates to a method of testing, or testing and grading materials in accordance with their physical or chemical characteristics.

Though this method could be used for testing, or both testing and grading a variety of different materials in accordance with their characteristics as determined by either the mechanical condition or chemical composition or condition of the constituent elements entering into the material, I might mention by way of example, that the invention readily lends itself to the testing and grading of tools, or of materials which enter into the construction of tools, or of forgings, castings, and the like.

My improved method is based on the fact that the permeability of the materials or pieces to be tested or the flux density set up therein when subjected to a magnetic field is dependent upon not only the kind of material or piece, and the size and shape of the material or piece, but also upon its properties as determined by the mechanical condition or homogeneity of the material and the chemical condition or proportions of the various ingredients or elements which make up the material.

The results of testing are obtained by my method, preferably not by the measurement or determination of the permeability of or flux density induced in any particular piece or material, but by a comparison of its permeability, or of the flux density, preferably through the action of an induced current whose value depends upon the permeability, with the permeability of a test piece whose condition from both mechanical and chemical standpoints is known. Further, by the use of suitable means responsive to electrical effects, due to conditions of permeability of the different pieces or materials as compared with the permeability of the test piece referred to, the various pieces can be sorted automatically into lots, dependent upon whether the pieces have permeabilities which are within limits substantially the same as the permeability of the test piece, or which exceed or are less than the permeability of the test piece by predetermined amounts.

Figure 1:
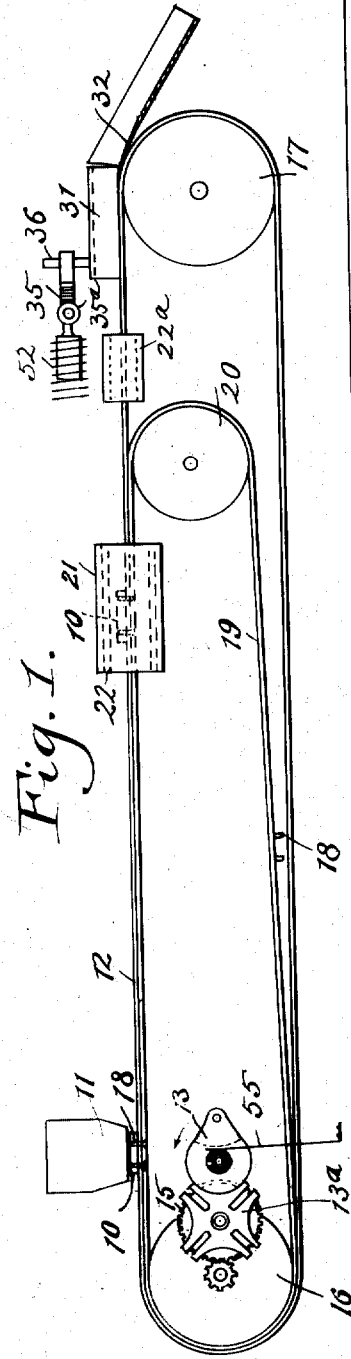
Figure 2:
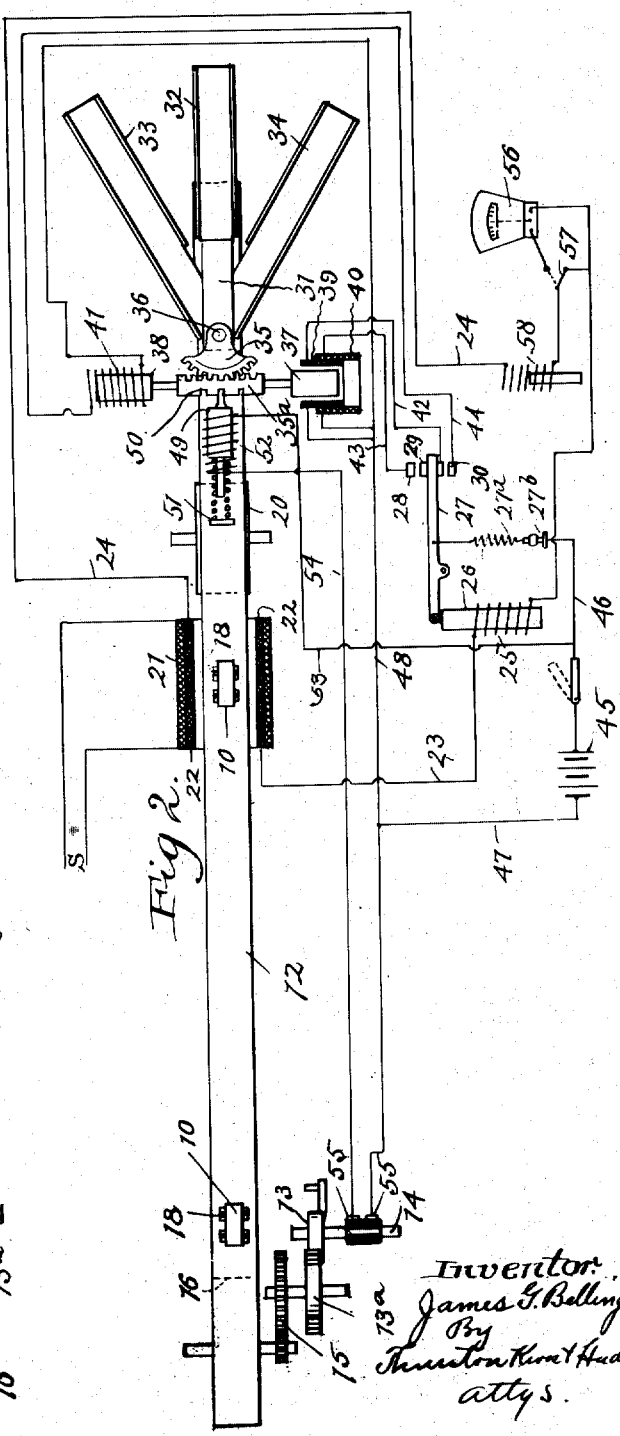

My invention can be carried out with many forms of apparatus and can be employed for many specifically different purposes, but that my method may be understood, I show in the accompanying sheet of drawings, in a more or less conventional or diagrammatic fashion, an apparatus which might be employed for one purpose, namely, the testing and sorting of metal pieces, and in the drawings, Fig. 1 is a side view illustrating the supplying, feeding, sorting, and part of the testing means; and Fig. 2 is a plan view of the same, showing also the electric circuits by which the permeability or flux density comparisons are made, and by which the apparatus is calibrated for a particular test piece or material similar to the pieces or materials to be tested.

The pieces 10 which are to be tested by comparing their permeabilities or the flux density set up therein with the permeability or flux density set up in a test or standard piece, are with the apparatus herein illustrated, fed, one at a time and at predetermined intervals from a hopper 11 onto an intermittently traveling belt 12 which can be given its intermittent movement by any suitable means as by the well-known Geneva stop movement including an actuating or single toothed member 13 on a shaft 14 which can be driven by a motor or other constant speed mechanism, and a member 13ª which at each revolution of the member 13 is moved through a portion of a revolution, in this instance, a quarter of a revolution.

The members 13ª is connected by multiplying gearing 15 to a pulley 16, which drives the belt 12, the latter passing about another pulley 17 located a suitable distance from the pulley 16.

It is important that the pieces 10 be disposed on the belt 12 in similar position, and in this instance this is accomplished by locating or positioning pins 18, fastened to a belt 19, which travels inside the belt 12, as shown, around the pulley 16, and around a pulley 20, so that these pins will project through the belt 12 and locate the pieces 10 accurately thereon in a predetermined position, and will be withdrawn from the belt 12 at the pulley 20.

Surrounding the upper portions of both belts between the pulleys 16 and 20 is a coil having a primary 21, and a secondary 22. The driving mechanism is so designed that the belts will come to rest each time one of the pieces 10 arrives at the center of the coil as shown in Fig. 1. The primary 21 of this coil is preferably connected to a source S, of alternating current either of constant amperage or constant potential. A constant pulsating current could be used, but this would have the disadvantage that it would leave certain specimens or pieces 10 with residual magnetism, but this could be overcome by causing the pieces 10 to pass through a coil such as shown at $22^a$, traversed by a demagnetizing current before the pieces 10 leave the belt. The term "changing current" might therefore be used in a broad sense to cover either an alternating current or a pulsating direct current.

The primary current induces a current in the secondary 22, and the current which is thus induced in the secondary is dependent upon the condition of 10. It will be understood that if the condition of the pieces 10 vary either from mechanical or chemical standpoints, the secondary current is varied.

The terminals of the secondary 22 are connected by conductors 23 and 24 to a solenoid 25 having a plunger 26 connected to a multiplying lever 27, whose end remote from the solenoid plunger is adapted to make contact with three separated contacts 28, 29 and 30. This lever at all times engages contact 29, and is adapted to be moved over so as to engage both contacts 28 and 29 or 30 and 29. The lever has connected to it a spring $27^a$ which can be adjusted by a screw $27^b$.

This lever by its co-operation with the three contacts, controls the position of a swinging sorting chute 31 which is arranged just above and at the end of belt 12, as shown in Figs. 1 and 2, and is designed to receive the pieces 10 and to guide them into one of three delivery or sorting chutes 32, 33 and 34. Chute 32 is in line with the belt and with the movable chute 31 when the latter is in its mid or normal position, and the chutes 33 and 34 extend off at suitable angles with respect to the middle chute 32. The position of the movable chute 31 is controlled in this instance by a toothed segment 35 arranged above and on the pivot 36 of the chute 31, and by a rack $35^a$, having at its ends plungers 37 and 38, the former constituting the core of two solenoids 39 and 40 arranged concentrically in this instance, but not necessarily so, and the plunger 38 being the core of another solenoid 41.

For the energization of the solenoids 39, 40 and 41, I employ in this instance an independent source of current, here shown as a battery 45, which has one terminal connected by a conductor 46 to the lever 27, and which has its other terminal connected by conductor 47 to one terminal of each of the three solenoids 39, 40 and 41. The other terminals of these solenoids are connected to the contacts 28, 29 and 30, solenoid 39 being connected by conductor 42 to contact 29, solenoid 40 by conductor 43 to contact 28, and solenoid 41 by conductor 44 to contact 30.

Inasmuch as lever 27 at all times engages contact 29, it follows that as long as the apparatus is in use, solenoid 39 is energized. The movement of the rack $35^a$ under the influence of this solenoid is such as to move the movable chute 31 into alignment with the middle delivery chute 32.

When the lever 27 engages contacts 28 and 29, as when a greater secondary current traverses solenoid 25 than traversed it when lever 27 engaged contact 29 alone, then both solenoids 39 and 40 are energized, and through the rack and pinion, chute 31 is moved into alignment with delivery chute 33.

When the attraction of plunger 26 by solenoid 25 is a minimum, spring $27^a$ exerts its pull on lever 27, causing the lever to engage both contacts 29 and 30. This energizes solenoid 41, and the movable chute 31 is thereby shifted into alignment with delivery chute 34.

In connection with the chute shifting mechanism I provide a lock which acts to normally hold the chute in a given position and prevents it being shifted through the action of any one of the three solenoids 39, 40 and 41, until the mechanism is automatically released. In this instance the lock is in the form of a tongue carried by a solenoid core or plunger 49, which tongue is adapted to engage into one of three properly positioned notches 50 on the back of the rack $35^a$. The plunger is moved to locking position by a spring 51, and it is moved in the opposite direction so as to release the chute shifting mechanism by a solenoid coil 52, whose terminals are connected by conductors 53 and 54 to the terminals of the battery, there being in the circuit, however, a pair of contacts 55 normally open but adapted to be electrically connected at each revolution of the Geneva movement member 13, the closing of the circuit of solenoid 52 taking place before each piece 10 leaves the coil 21—22 so that this chute can be swung to proper position with respect to delivery chutes 32, 33 and 34. Immediately after the chute 31 is properly positioned by the action of the proper solenoid or solenoids, the chute shifting mechanism is locked in position by the action of the spring 51 and by the de-energization of solenoid 52 by the opening of its circuit at contacts 55.

To calibrate the solenoid 25, the master specimen or test piece 10 is placed in the coil 21—22, and the current or energy flowing in the secondary is read by a suitable instrument such as an ammeter or watt meter 56, which can be placed in the secondary circuit by the movement of a switch 57, this switch normally closing the secondary circuit with the instrument eliminated therefrom. An adjustable resistance or choke coil 58 is then so adjusted that only a given current can flow, and then by adjusting the tension of the spring $27^a$ by means of the adjusting screw 27ᵇ, it follows that any desired per cent change of current, whether of a plus value or a minus value with respect to the value when the test piece is in the coil 21—22 after the adjustment has been made by the choke coil resistance 58, will cause contact to be made between the lever 27 and either contact 28 or contact 30.

After the instrument has been adjusted, as above explained, the pieces to be tested are sent through the apparatus, the operation of the mechanism being such that they are deposited one at a time, at the proper intervals and in the proper position on the conveying belt 12. As each piece comes to the center of the coil 21—22, the movement of the belt is stopped temporarily, and as a changing current, either alternating or pulsating direct is flowing in the primary, a current is induced in the secondary having a value which is directly proportionate to the permeability of the piece, or to the flux density set up therein. If this permeability or flux density is the same, or substantially the same as that of the test piece, it follows that the lever 27 will be swung to or substantially to its mid position, engaging only contact 29, in which event only the solenoid 39 will be energized, and as soon as the circuit of the locking solenoid 52 is closed at the contacts 55, this taking place immediately after the lever 27 has assumed its proper position, the movable delivery chute 31 if previously in the mid position will be held in that position, but if not, it will be swung to its mid position and immediately thereafter it is locked in that position through the action of the spring on the plunger 49, the spring becoming effective to shift the plunger to locking position on the opening of the circuit of the solenoid 52, which takes place at the contacts 55 shortly after the closure of said circuit.

The particular piece being tested is therefore a substantially perfect piece (assuming that the test piece is a perfect piece) which is to be delivered through the middle delivery chute 32.

The single toothed gear then again comes into action, again actuating the belt so as to bring the next piece into the coil 21—22 and to deliver the piece already in the coil 21—22 through the chute 31, now held in its middle position, into the inclined delivery chute 32. The operation is then repeated for the piece now placed in the coil. Should this piece also be a perfect piece, the delivery chute will not be shifted from its mid position, and it also will be delivered through the middle chute 32, but should the permeability of the piece now under consideration, or should the flux density which is induced therein, be greater or less by a predetermined amount than that of the test piece, the lever 27 will be swung either to a position so as to engage contact 28 or contact 30, and the movable delivery chute 31 will be swung to align either with delivery chute 33 or delivery chute 34, depending upon whether the permeability or flux density was by the predetermined amount, greater or less than that of the test piece. This piece will therefore be delivered not with the perfect specimens, but through either the delivery chute 33 or 34, depending upon whether the permeability or flux density was greater or less than that of the test piece.

This change in the permeability of flux density is due to some variation in the condition of the piece, which variation may be either a mechanical one such as a flaw, or an excessive or insufficient degree of hardness, or a chemical one such as a variation from normal in the amount of some ingredient entering into the composition of the piece.

Thus as the apparatus continues its operation, the pieces are successively tested and automatically sorted in accordance with their conditions, the so-called perfect pieces going into one lot, and the so-called more or less defective pieces going into one of two other lots, dependent upon whether the defects or variation in the condition of the pieces caused relatively high or relatively low permeability or flux density.

The delivery of the pieces 10 from the hopper 11 onto the belt 12, may be controlled by any suitable mechanism such as a gate operating synchronously or in predetermined timed relationship with the belt driving mechanism.

The apparatus as herein constructed and operated is especially useful in enabling a manufacturer of quantities of a given article, such for example, as tools, to determine whether the articles are perfect or imperfect, and if the latter, for what reason. It is not essential that finished tools be fed through the apparatus for they may be partially completed tools for example, or pieces of machined or unmachined articles, but designed for the production of the tools.

Any suitable type or shape of parts or pieces may be thus tested by apparatus such as above, the conveying means being, of course, designed to accommodate or handle pieces of any given design or shape.

Under some circumstances it may be desirable to carry out the testing feature without the sorting feature, in which event the apparatus could be used with the instrument 56 in circuit if desired, or with it out of circuit, in which event a current responsive device, such as the lever 27 could be utilized to indicate the condition of the pieces, or of different portions of the same piece fed through the coil 21—22.

If it is likely that the condition which causes the permeability or flux density to be greater or less by the predetermined amount than that of the standard piece, might be both mechanical or chemical, after the sorting as above explained further testing would be required to determine what condition caused the defect, but should the proportions of the ingredients or the chemical condition of the pieces be known to be that of the test piece, the operator will know that the variations in permeability or flux density were due to mechanical reasons, and it follows that should the mechanical condition of the pieces be known to be that of the test piece, the operator will know that the variation in permeability or flux density was due to a chemical condition such as an excess of or an insufficient amount of an ingredient entering into the composition of the pieces.

It will be obvious that the mechanical means which is electrically controlled to accomplish the sorting, may assume many different forms, and it will be understood also that while I have shown apparatus by which the pieces are sorted into three groups, it is not at all necessary that the method be confined to sorting into three groups or lots only, but that the number of gradations might be increased to any desired number.

Having described my invention, I claim:

1. The method which consists in successively subjecting pieces to a device sensitive to variations in the permeabilities of the pieces from the permeability of a test or standard piece, and utilizing said device for automatically sorting the pieces into one lot if their permeabilities are equal to or approximate the permeability of the test or standard piece, or into one of a plurality of other lots depending upon the character of the differences between their permeabilities and the permeability of the test piece.

2. The method which consists in feeding pieces through a magnetic field and utilizing the electrical effect of the pieces on a circuit assocated with the magnetic field for automatically sorting them into a plurality of lots in accordance with their magnetic permeabilities one lot including the pieces whose magnetic permeabilities approximate a certain value, and a second lot including those whose permeabilities vary in a certain manner from said value, and a third lot including those whose permeabilities vary in a still different manner from said value.

3. The method which consists in feeding pieces through a magnetic field and utilizing the electrical effect of the pieces on a circuit associated with the magnetic field for automatically sorting them into one lot which includes those whose permeabilities approximate a certain value, or into a plurality of other lots depending upon the extent or manner in which their permeabilities vary from said value.

In testimony whereof, I hereunto affix my signature.

JAMES G. BELLINGER.